United States Patent [19]

Kawakubo et al.

[11] Patent Number: 4,837,274
[45] Date of Patent: Jun. 6, 1989

[54] CURABLE COMPOSITION

[75] Inventors: Fumio Kawakubo; Sadao Yukimoto, both of Kobe; Michihide Homma, Takasago, all of Japan

[73] Assignee: Kanegafuchi Kagaku Kogyo Kabushiki Kaisha, Osakak, Japan

[21] Appl. No.: 102,687

[22] Filed: Sep. 29, 1987

[30] Foreign Application Priority Data

Sep. 30, 1986 [JP] Japan ................... 61-232229

[51] Int. Cl.$^4$ ............................... C08F 8/00
[52] U.S. Cl. ................... 525/100; 524/265; 524/266; 524/267; 524/268; 524/730; 524/731; 525/103; 525/104; 525/105; 525/106; 525/403; 525/404; 525/912; 528/17; 528/18; 528/21; 528/22; 528/33; 528/34
[58] Field of Search ........... 525/403, 404, 912, 100, 525/103, 104, 105, 106; 528/33, 34, 17, 18, 21, 22; 524/265, 266, 267, 268, 730, 731

[56] References Cited

U.S. PATENT DOCUMENTS 3,971,751 7/1976 Isayama et al. ............... 524/783
4,323,488 4/1982 Takago et al. ................. 528/17
4,657,986 4/1987 Isayama et al. ............... 525/100

FOREIGN PATENT DOCUMENTS 61-34066 2/1986 Japan .
61-34067 2/1986 Japan .

Primary Examiner—Melvyn I. Marquis
Attorney, Agent, or Firm—Armstrong, Nikaido Marmelstein Kubovcik & Murray

[57] ABSTRACT

A curable composition comprising (A) an organic polymer containing at least one reactive silicon functional group crosslinkable to produce an elastomer by the formation of a siloxane bond in its molecule and (B) an organic silicon compound having a molecular weight of not less than 140 and represented by the formula (1):

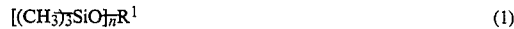

$$[(CH_3)_3SiO]_{\overline{n}}R^1 \qquad (1)$$

wherein $R^1$ is a residue of an alcohol or a weak acid which has a valency of n, and n is a positive integer. The composition of the invention can give cured product having excellent modulus and elongation as well as has excellent storage stability.

9 Claims, No Drawings

CURABLE COMPOSITION

BACKGROUND OF THE INVENTION

The present invention relates to a novel curable composition which can be cured with moisture giving a rubbery substance having improved tensile properties and low residual tack and which has excellent storage stability. More particularly, the present invention relates to a curable composition comprising an organic polymer having a reactive silicon functional group in its molecule and a specific organic silicon compound, capable of giving a rubbery substance having improved tensile properties and low residul tack and having excellent storage stability.

As a polymer which is viscous liquid before curing and which can be cured even at room temperature to form a rubbery substance, there has been widely known a room temperature vulcanizable silicone rubber (hereinafter referred to as "RTV polysiloxane"). The RTV polysiloxane is suitable for use in sealants for building, molding materials, and the like. However, the RTV polysiloxane is expensive since its main chain is a polysiloxane, and is poor in some physical properties.

There has been proposed an elastomeric organic polymer curable at room temperature like the RTV polysiloxane whose main chain is not polysiloxane but an elastomeric organic polymer as shown in, for instance, U.S. Pat. No. 3,971,751. The elastomeric organic polymer has a reactive silicon functional group crosslikable by the formation of aa siloxane bond through a silanol condensation reaction and it is cured even at room temperature to form a rubbery substance, as shown in the following reaction scheme.

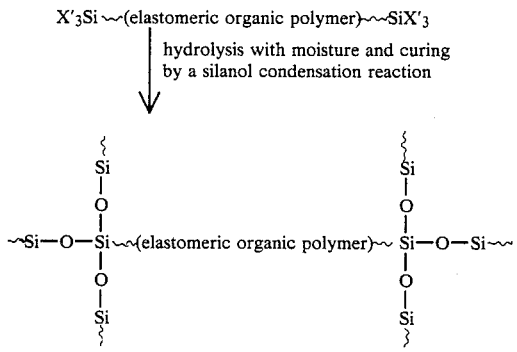

Wherein X' is a hydrolyzable group. This elastomeric organic polymer is inexpensive compared to the RTV polysiloxane and has some characteristics which are not present in the polysiloxane.

Generally rubbers are required to have a low modulus of elasticity and high elongation as their tensile properties. On the other hand, important properties required for a room temperature curable polymer are to cure to the extent the surface of the cured product is not sticky (low residual tack) and to be stable during storage before curing (storage stability). In order to improve the modulus of elasticity or elongation of the cured product of the elastomeric organic polymer having the reactive silicon group, a method has been proposed using a composition comprising the elastomeric organic polymer and a monovalent compound or its derivative as shown in Japanese Unexamined Patent Publication No. 34066/1986 and No. 34067/1986.

This method is very simply and useful for controlling the tensile properties. However the composition disclosed in the above publications has a following drawback. That is, when the modulus of elasticity and elongation of cured product are sufficiently inproved, the residual tack of cured product or the storage stability of the composition deteriorates, and when the residual tack and the storage stability are sufficient, the improvement of the modulus of elasticity and elongation is insufficient.

An object of the present invention is to provide a curable composition comprising an elastomeric organic polymer having a reactive silicon functional group, which has improved modulus of elasticity and elongation of the cured product and low residual tack of the cured product, and excellent storage stability.

The above and other objects of the invention will become apparent from the description hereinafter.

SUMMARY OF THE INVENTION

In accordance with the present invention, there is provided a curable composition comprising (A) an organic polymer having at least one reactive silicon functional group crosslinkable to produce an elastomer by the formation of a siloxane bond in its molecule and (B) an organic silicon compound having a molecular weight of not less than 140 and represented by the formula (1):

$$[(CH_3)_3SiO]_{\overline{n}}R^1 \qquad (1)$$

wherein $R^1$ is a residue of an alcohol or a weak acid which has a valency of n, and n is a positive integer.

The composition of the invention can give a cured product having low residual tack and an improved modulus of elasticity and elongation and is excellent in the storage stability.

DETAILED DESCRIPTION

The elastomeric organic polymer having the reactive silicon functional group in its molecule used in the present invention [hereinafter referred to as "organic polymer (A)"] can be prepared by methods disclosed in, for instance, U.S. Pat. No. 3,971,751, Japanese Examined Patent Publication No. 36319/1970, No. 12154/1971 and No. 32678/1974 and Japanese Unexamined Patent Publication No. 156599/1975, No. 73561/1976, No. 6096/1979, No. 13767/1980, No. 13768/1980, No. 82123/1980, No. 123620/1980, No. 125121/1980, No. 131021/1980, No. 131022/1980, No. 135135/1980 and No. 137129/1980.

As the organic polymer (A), a polymer having rubber-like properties to which reactive silicon functional groups are introduced can be used. Examples of the polymer having rubber-like properties are, for instance, polyether, polyester, ether-ester block copolymer, polybutadiene, styrene-butadiene copolymer, acrylonitrile-butadiene copolymer, acrylic acid ester-butadiene copolymer, ethylene-butadiene copolymer, vinylpyridine-butadiene copolymer, ethyene-propylene copolymer, ethylene-vinylacetate copolymer, ethylene-acrylic acid ester copolymer, polyisoprene, styrene-isobutylene copolymer, styrene-isoprene copolymer, isobutylene-isoprene copolymer, polychloroprene, styrene-chloroprene copolymer, acrylonitrile-chloroprene copolymer, polyisobutylene, polyacrylic acid ester, polymethacrylic acid ester, and the like.

There are preferably used as the organic polymer (A) the polymer whose main chain is substantially composed of polyether, polyester or the ether-ester block copolymer, more preferably the polymer whose main chain is substantially composed of polyether.

The organic polymer (A) has a number average molecular weight of 300 to 30,000, preferably from 500 to 15,000, more preferably from 5,000 to 15,000. When the mumber average molecular weight of the polymer (A) is less than 300, the mokulus of elasticity of the cured product becomes large and the elongation becomes small. On the other hand, when the molecular weight is more than 30,000, the viscosity of the organic polymer (A) becomes too large to handle.

The term "reactive silicon functional group" used in the instant specification means a group which can be cross-linked by the formation of a siloxane bond (Si-0-Si) through a silanol condensation reaction. As the reactive silicon functional group, there is exemplified a group in which a hydrolyzable group or hydroxyl group is bonded to silicon atom.

Representative example of the reactive silicon functional group is a group represented by the formula (2):

(2)

wherein $R^3$ is a monovalent hydrocarbon group having 1 to 20 carbon atoms selected from the group consisting of an alkyl group, an aryl group and an aralkyl group or a triorganosiloxy group represented by the formula (3):

$$(R^4)_3SiO—$$ (3)

in which each $R^4$ is a monovalent hydrocarbon group having 1 to 20 carbon atoms, and when more than one $R^3$ are present, the groups $R^3$ are the same or different; X is a hydroxyl group or a hydrolyzable group, and when more than one X are present, the groups X are the same or different; a is 0 or an integer of 1 to 3 and b is 0, 1 or 2, provided that at least one X is present in the silicon functional group; and m is 0 or an integer of 1 to 18.

As aforementioned, the groups $R^3$ are the same or different and each is the monovalent hydrocarbon group having 1 to 20 carbon atoms selected from the alkyl group, aryl group and aralkyl group; or the triorganosiloxy group. Examples of the hydrocarbon group are, for instance, an alkyl group such as methyl group or ethyl group, a cycloalkyl group such as cyclohexyl group, an aryl group such as phenyl group, and an aralkyl group such as benzyl group. The triorganosiloxy group has the formula (3):

$$(R^4)_3SiO—$$ (3)

wherein each $R^4$ is a monovalent hydrocarbon group having 1 to 20 carbon atoms such as methyl group or phenyl group. Group X is hydroxyl group or a hydrolyzable group. Examples of the hydrolyzable group are, for instance, a halogen atom, a hydrogen atom, an alkoxy group, an acyloxy group, a ketoxymate group, an amino group, an amido group, an aminoxy group, a mercapto group, an alkenyloxy group, and the like, Among them, the alkoxy group, especially methoxy group, is preferable because the group is suitably hydrolyzed. Among the above reactive silicon functional group, there is prefered a group represented by the formula (4):

(4)

wherein $R^3$, X and a are as defined above provided that a is 0, 1 or 2.

It is preferable that the number of the reactive silicon functional groups in the organic polymer (A) is on the average from 1.1 to 5.0, more preferably from 1.9 to 4.0, per molecule of the polymer (A). When the number of the reactive silicon functional groups is less than 1.1, the polymer is unsatisfactorily cured. On the other hand, when the number is more than 5.0, there is a case that the cured product is not rubber-like. When the number is from 1.9 to 4.0, the cured product is suitable in the residual tack in case of using the composition as a sealant and has exellent properties as the rubber.

The reactive silicon functional groups can exist at any position in the organic polymer (A). It is preferable that the reactive silicon groups exist at the molecular ends from the standpoint that it is easy to obtain a rubber-like cured product.

The method of preparation of the organic polymer (A) is explained taking a polyether as an example as shown below.

A hydrogenated silicon compound represented by the formula (5):

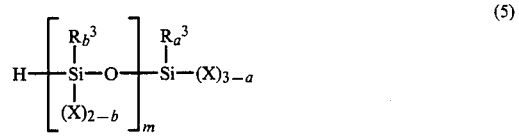

(5)

wherein $R^3$, X, a, b and m are as defined above is reacted with an alkylene oxide polymer having an olefin group represented by the formula (6):

(6)

wherein Z is a bivalent organic group having 1 to 40 carbon atoms such as

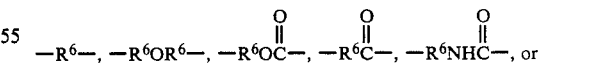

in which $R^6$ is a vivalent hydrocarbon group having 1 to 20 carbon atoms and when two groups $R^6$ are present, the groups $R^6$ are the same or different; $R^5$ is a hydrogen atom or a substituted or unsubstituted monovalent organic group having 1 to 20 carbon atoms; and c is 0 or 1, in the presence of a platinum catalyst such as chloroplatinic acid according to a so-called hydrosilylation to give the organic polymer (A).

In addition to the above-mentioned method, there are exemplified the methods (I) to (III) for preparing the alkylene oxide polymer having the reactive silicon functional group.

(I): A method in which a polyisocyanate compound such as tolylene diisocyanate is reacted with an alkylene oxide polymer having hydroxyl groups at the molecular ends to give an alkylene oxide polymer having isocyanate groups at the molecular ends, and then the isocyanate groups in the alkylene oxide polymer are reacted with groups W in a silicon compound represented by the formula (7):

wherein W is an active hydrogen-containing group selected from the group consisting of a hydroxyl group, a carboxyl group, a mercapto group and a primary and secondary amino groups; and $R^3$, $R^6$, X and a are as defined above provided that a is 0, 1 or 2

(II): A method in which mercapto group in the silicon compound represented by the formula (7) wherein W is mercapto group is reacted with the olefin groups in the alkylene oxide polymer having a group represented by the formula (6)

(III): A method in which hydroxyl groups in the alkylene oxide polymer having hydroxyl groups at the molecular ends are reacted with a compound represented by the formula (8):

wherein $R^3$, $R^6$, X and a are as defined above provided that a is 0, 1 or 2. The methods for preparing the alkylene organic polymer (A) are not limited thereto.

Examples of the hydrogenated silicon compound represented by the formula (5) are, for instance, halogenated silanes such as trichlorosilane, methyldichlorosilane, dimethylchlorosilane, and trimethylsiloxydichlorosilane; alkoxy silanes such as trimethoxysilane, triethoxysilane, methyldimethoxysilane, phenyldimethoxysilane, and 1,3,3,5,5,7,7-heptamethyl-1,1-dimethoxytetrasiloxane; acyloxysilanes such as methyldiacetoxysilane, and trimethylsiloxymethylacetoxysilane; ketoxymate silanes such as bis(dimethylketoxymate)methylsilane, bis(cyclohexylketoxymate)methyl silane, and bis(diethylketoxymate)trimethylsilane; hydrosilanes such as dimethylsilane, trimethylsiloxymethyl silane, and 1,1-dimethyl-2,2-dimethyldisiloxane; alkenyloxy silanes such as methyldi(isopropenyloxy)silane; and the like. The hydrogenated silicon compounds (5) are not limited thereto.

In the reaction of the hydrogenated silicon compound represented by the formula (5) with the alkylene oxide polymer having olefin groups represented by the formula (6), after the completion of the reaction, a part or all of the groups X can be converted into other hydrolyzable groups or hydroxyl group. For instance, in case that the group X in the formula (5) is a halogen atom or a hydrogen atom, it is rather preferable that the group X is converted into an alkoxy group, an acyloxy group, an aminoxy group, an alkenyloxy group, hydroxyl group, or the like.

In the formula (6), $R^5$ is a hydrogen atom or a substituted or unsubstituted monovalent organic group having 1 to 20 carbon atoms. It is preferable that the group $R^5$ is hydrogen atom or the hydrocarbon group, more preferably hydrogen atom. Z is a bivalent organic group having 1 to 40 carbon atoms, preferably 1 to 20 carbon atoms. It is preferable that the group Z is

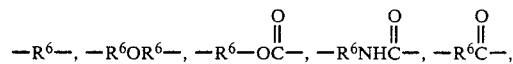

wherein $R^6$ is as defined above. Methylene group is particularly preferred as the group Z.

The alkylene oxide polymer having the olefin group represented by the formula (6) can be prepared by various methods, for instance, by a method disclosed in Japanese Unexamined Patent Publication No. 6097/1979, or a method wherein an epoxy compound such as ethylene oxide or propylene oxide is copolymerized with an olefin group-containing epoxy compound such as allyl glycidyl ether to produce the alkylene oxide polymer having the olefin groups in its side chains.

In the alkylene oxide polymer used in the presented invention, it is preferable that the main chain has essentially recurring units to the formula (9):

wherein $R^2$ is a bivalent hydrocarbon group having 1 to 8 carbon atoms. It is most preferable that the recurring units are mostly composed of recurring units represented by the formula (9) wherein $R^2$ is a hydrocarbon group having 1 to 4 carbon atoms.

The term "essentially" as mentioned above means that the main chain may include monomer units and/or polymer units other than $-R^2-O-$. The organic polymer (A) has more than 50% by weight, preferably more than 70% by weight, more preferably more than 90% by weight of the above-mentioned recurring units. Examples of the bivalent hydrocarbon group $R^2$ are, for instance,

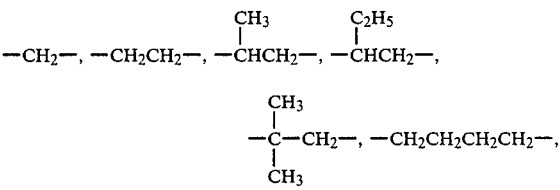

and the like.

The main chain of the alkylene oxide polymer is composed of recurring units of one kind, or 2 or more kinds. Particularly, it is preferable that $R^2$ is

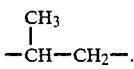

It is preferable that the number average molecular weight of the alkylene oxide polymer is 300 to 30,000, more preferably 500 to 15,000, especially 5,000 to 15,000.

The organic polymer (A) may be used alone or as an admixture thereof.

There can be used a polymer obtained by polymerizing various vinyl monomers in the presence of the organic polymer (A). In such a case, it is preferable that the alkylene oxide polymer having reactive silicon functional groups is used as the organic polymer (A).

The organic polymer obtained by polymerizing various vinyl monomers in the presence of the organic polymer (A) can be prepared in various methods, for instance, methods disclosed in Japanese Unexamined Patent Publication No. 78223/1984, No. 228516/1985, No. 228517/1985, and the like.

In the present invention, an organic silicon compound [hereinafter referred to as "organic silicon compound (B)"] represented by the formula (1):

$$[(CH_3)_3SiO]_nR^1 \quad (1)$$

wherein $R^1$ is a residue of an alcohol or a weak acid having a valency of n, and n is a positive integer, and having a molecular weight of not less than 140 is used together with the organic polymer (A).

In the formula (1), it is preferable that n is 1, 2 or 3.

Examples of the $R^1$ in the formula (1) are, for instance, a residue of a substituted or unsubstituted aliphatic alcohol having 2 to 30 carbon atoms such as n—$C_4H_9OH$, iso—$C_4H_9OH$, n—$C_5H_{11}OH$, iso—$C_5H_{11}OH$, $ClCH_2CH_2OH$, $C_6H_5CH_2OH$, $ClCH_2CH_2CH_2OH$, $HOCH_2CH_2OH$, $HOCH_2CH_2CH_2OH$, $HOCH_2CH(CH_3)OH$, $HOCH_2CH_2CH_2CH_2OH$, $HOCH_2CH(OH)CH_2OH$ or acetyl acetone; a residue of a substituted or unsubstituted aromatic hydroxyl compound having 6 to 30 carbon atoms such as phenol, cresol, chlorophenol, bisphenol, naphthol, hydroquinone or hydronaphthoquinone; a residue of a substituted or unsubstituted aliphatic or aromatic carboxylic acid having 2 to 30 carbon atoms such as propionic acid, butyric acid, valeric acid, capric acid, caproic acid, lauric acid, palmitic acid, stearic acid, oleic acid, heptacosanoic acid, behenic acid, melissic acid, acrylic acid, undecylenic acid, sorbic acid, linolwic acid, linolenic acid, arachidonic acid, propiolic acid, oxalic acid, malonic acid, succinic acid, glutaric acid, adipic acid, maleic acid, fumaric acid, itaconic acid, benzoic acid, phthalic acid, terephthalic acid, trimellitic acid, toluic acid, chlorobenzoic acid or hydroxy propionic acid; a residue of a polymeric compound having hydroxyl or carboxyl group such as diethylene glycohol, triethylene glycohol, polyethylene glycohol, polypropylene glycohol, polybutadiene having terminal hydroxyl or carboxyl group, hydrogenated polybutadiene having terminal hydroxyl or carboxyl group or polyethylene telephthalate having terminal hydroxyl and/or carboxyl group; a residue of an inorganic acid such as boric acid or carbonic acid; and the like.

It is preferable to use as $R^1$ a member selected from the group consisting of a group composed of carbon atom and hydrogen atom, a group composed of carbon atom and oxygen atom, a group composed of carbon atom, hydrogen atom and oxygen atom, a group composed of carbon atom, hydrogen atom and a halogen atom and a group composed of carbon atom, hydrogen atom, oxygen atom and a halogen atom. Among the above-mentioned examples of $R^1$, it is particularly preferable that $R^1$ is the substituted or unsubstituted phenyl group (a residue of substituted or unsubstituted phenol) from the standpoint that the organic silicon compound having the substituted or unsubstituted phenyl group can be easily obtained.

The term "a weak acid" used in the instant specification means an acid of which pka is not less than 1, preferably not less than 2, more preferably not less than 3 in the state of a solution.

The molecular weight of organic silicon compound (B) is not less than 140, preferably not less than 150. When the molecular weight is below 140, the improvement of modulus of elasticity and elongation of cured product is insufficient. Also the molecular weight of organic silicon compound (B) is preferably not more than 5,000, more preferably not more that 2,000. When the $R^1$ is a residue of polymeric compound, the molecular weight means number average molecular weight.

Preferable examples of the organic silicon compound (B) are, for instance,

$ClCH_2CH_2OSi(CH_3)_3$, $CH_3CHCH_2OSi(CH_3)_3$,
                                                    |
                                                    Cl

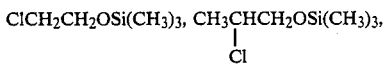

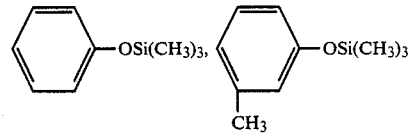

$(CH_3)_3SiO(CH_2)_4OH$  $(CH_3)_3SiOCH_2CHCH_2OSi(CH_3)_3$,
                                                                  |
                                                                  $OSi(CH_3)_3$ $(CH_3)_3SiOCH_2CH$—$OSi(CH_3)_3$, $(CH_3)_3SiO(CH_2)_4OSi(CH_3)_3$,
                         |
                         $CH_3$ $[(CH_3)_3SiO]_3CC_2H_5$, p-$(CH_3)_3SiOC_6H_4OSi(CH_3)_3$,

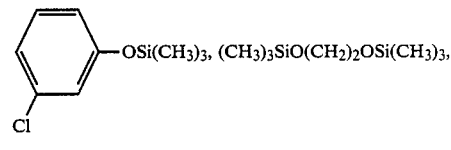

$(CH_3)_3SiO(CH_2CH_2O)_2Si(CH_3)_3$, $(CH_3)_3SiO(CH(CH_3)CH_2O)_2Si(CH_3)_2$, $(CH_3)_3SiOCOCH_2CH_2CH_2CH_2COOSi(CH_3)_3$, $(CH_3)_3SiO$—CO—$C_6H_5$, $(CH_3)_3SiO(CH_3)C$=$CHCOCH_3$, $[(CH_3)_3SiO]_3B$, $[(CH_3)_3SiO]_2CO$, and the like. As the compound (B), the compound having the formula:

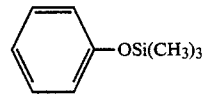

is particularly preferable from the point that it can be easily obtained.

The amount of the organic silicon compound (B) is suitably determined depending on the desired properties of the cured product. Usually, the amount of the organic silicon compound (B) is from 0.1 to 10 parts by weight, preferably 0.5 to 5 parts by weight based on 100 parts by weight of the organic polymer (A).

When the composition of the present invention is prepared, the organic silicon compound (B) is uniformly dissolved or dispered in the organic polymer (A), with stirring and if necessary with heating. It is not necessary to make the mixture of the organic polymer (A) and the organic silicon compound (B) entirely uniform, and the object of the invention can be satisfactorily attained when the organic silicon compound (B) is almost uniformly dispersed in the organic polymer (A) even if the mixture is not transparent. If necessary, an agent for improving the dispersibility such as a surface active agent can be used.

The curable composition of the present invention can be suitably employed as an adhesive material, a pressure sensitive adhesive material, a paint, a sealing material, a water proofing material, a spraying material, a molding material, a casting rubber material, and the like, by adding various additives, as occasion demands. Examples of the additives are, for instance, reinforcing or non-reinforcing fillers such as white carbon, carbon black, calcium carbonate, titanium oxide, talc, asbestos or glass fiber, plasticizers, antioxidants, ultraviolet absorbents, pigments, flame retardants, and the like. The curable composition of the invention is particularly suitable for use in sealing compositions.

When the curable composition of the present invention is used as the sealing composition, the composition can contain plasticizers, fillers, reinforcements, antisagging agent, coloring agents, antioxidants, adhesion accelerators, curing catalysts, modifiers, and other additives, as occasion demands.

For controlling the properties of the composition or the cured product, the plasticizer may be contained in the composition. Examples of the plasticizer are, for instance, a phthalic acid ester such as dibutyl phthalate, diheptyl phthalate, di(2-ethylhexyl)phthalate, butylbenzyl phthalate or butylphthalylbutyl glycolate; a non-aromatic dibasic acid ester such as dioctyl adipate or dioctyl sebacate; an ester of polyalkylene glycol such as diethylene glycol dibenzoate or triethylene glycol dibenzoate; a phosphoric acid ester such as tricresyl phosphate or tributyl phosphate; a chlorinated paraffin; a hydrocarbon oil such as an alkyl diphenyl or a partially hydrogenated terphenyl; and the like. The plasticizers are used alone or as an admixture thereof. It is possible to admix the placticizers at the time when preparing the organic polymer(A).

As the fillers or the reinforcement, conventional ones are used. Examples of the fillers and the reinforcements are, for instance, heavy or light calcium carbonate; calcium carbonate the surface of which is treated with a fatty acid, a resin acid, a cationic surface active agent, or an anionic surface active agent; magnecium carbonate, talc, titanium oxide, barium sulfate, alumina, metal powder such as aluminum powder, zinc powder or iron powder, bentonite, kaoline clay, fumed silica, quartz powder, carbon black, and the like. The fillers or reinforcements are employed alone or as an admixture thereof. When using the filler or the reinforcement capable of giving transparency to the composition such as fumed silica, sealing compositions having the excellent transparency can be obtained.

Examples of the antisagging agent are, for instance, a derivative of hydrogenated castor oil, metallic soaps such as calcium stearate, aluminum stearate or barium stearate, and the like.

As the coloring agent, a usual inorganic pigment, organic pigment, dye or the like can be used, as occasion demands.

As the modifier, various silane coupling agents are used, as occasion demands. Examples of the silane coupling agents are, for instance, alkylalkoxysilanes such as methyltrimethoxysilane, dimethyldimethoxysilane such as dimethyldiisorpropenoxysilane, methltriisopropenoxysilane and $\gamma$-glycidoxypropylmethyldiisopropenoxysilane; alkoxysilanes having a functional group such as $\gamma$-glycidoxypropylmethyldimethoxysilane, $\gamma$-glycidoxypropyltrimethoxysilane, vinyltrimethoxysilane, vinyldimethylmethoxysilane, $\gamma$-aminopropyltrimethoxysilane, N-($\beta$-aminoethyl)aminopropylmethyldimethoxysilane, $\gamma$-mercaptopropyltrimethoxysilane and $\gamma$-mercaptopropylmethyldimethoxysilane; silicone varnish; polysiloxanes; and the like.

By employing the above-mentioned modifiers, it is possible to increase the hardness of the cured product or to decrease the hardness to give better elongation property. Although the curable composition of the present invention itself has good adhesion to glass, ceramics or metals, the composition of the invention can be widely adhered to various materials by employing primers. The adhesion property of the curable composition to various materials can be further improved by incorporation of adhesion accelerators such as epoxy resins, phenol resins, various silane coupling agents, alkyltitanates or aromatic polyisocyanates. The accelerators may be used alone or as an admixture thereof.

Examples of the curing catalyst are, for instance, a titanate such as tetrabutyl titanate or tetrapropyl titanate; an organotin compound such as dibutyl tin dilaurate, dibutyl tin maleate, dibutyl tin diacetate, tin octylate or tin naphthenate; lead octylate; an amine compound such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)-phenol, morpholine, N-methylmorpholine or 1,3-diazabicyclo-(5,4,6)undecene-7(DBU), and its salt with a carboxylic acid or the like; a polyamide having a low molecular weight obtained by the reaction of an excess polyamine with a polybasic acid; a reaction product of an excess polyamine with an epoxy compound; and a silane couping agent having an amino group, e.g. a silanol condensation catalyst such as $\gamma$-aminopropyltrimethoxysilane or N-($\beta$-aminoethyl)aminopropylmethyldimethoxysilane; and the like. The curing catalysts may be employed alone or as an admixture thereof.

A solvent may be incorporated into the curable composition of the invention in order to improve the workability or to lower the viscosity of the composition. Examples of the solvent are, for instance, an aromatic hydrocarbon solvent such as toluene or xylene; an ester solvent such as ethyl acetate, butyl acetate, amyl acetate or cellosolve acetate; a ketone solvent such as methyl ethyl ketone, methyl isobutyl ketone or diisobutyl ketone; and the like. The above solvents may be used upon preparing the organic polymer (A).

Although it is not necessary to use antioxidant or ultraviloet absorbent a conventional antioxidant or ultraviolet absorbent may be used as occasion demands.

When using the curable composition of the present invention as the sealing material, the sealing material can be used in the form of a one-package composition wherein all the ingredients in the sealing material are previously admixed and the mixture is stored in an airtight container. The material, when applied, is cured by atmospheric moisture. The sealing material can be provided as a two-package composition wherein the curing agent component containing a curing catalyst, a filler, a plasticizer, a water, or the like and the main component comprising the organic polymer (A) and organic silicon compound (B) are separately prepared and the curing agent component and the main component are mixed just before using.

When the curable composition of the invention is used as the one-package composition, it is preferable that the ingredients containing moisture are previously dehydrated and dried or the dehydration is conductd under reduced pressure during blending and kneading the all ingredients.

When using the curing composition of the invention as the two-package composition, though the gelation hardly occurs even if there is a little moisture in the components since the curing catalyst and the organic polymer (A) are separately stored, it is preferable to dehydrate and dry when it is required to obtain the excellent storage stability.

As the dehydrating and drying method, a drying method with heating is suitably employed when the ingredients are solids, and when the ingredients are liquid, a dehydrating method under reduced pressure, or a dehydrating method using a synthetic zeolite, active alumina, silica gel, and the like is preferable. Also, the dehydration can be conducted by introducing a small amount of isocyanate compound to the ingredients; any water present will react with isocyanate groups.

In addition to the dehydration and drying, the storage stability can be further improved by adding lower alcohols such as methanol and ethanol, or alkoxysilanes such as n-propyltrimethoxysilane, vinylmethyldimethoxysilane, γ-mercaptopropylmethyldimethoxysilane, γmercaptopropylmethyldiethoxysilane and γglycidoxypropyltrimethoxysilane.

The present invention is more specifically described and explained by means of the following Examples and Comparative Examples in which all percentages and parts are by weight unless otherwise noted. It is to be understood that the present invention is not limited to the Examples, and various changes and modifications may be made in the invention without departing from the spirit and scope thereof.

EXAMPLE 1

To 100 g of a propylene oxide polymer having an average molecular weight of 9,600 and having on the average three dimethoxysilyl groups of the formula:

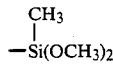

per polymer molecule was added 1.75 g of an organic silicon compound: $(CH_3)_3SiOC_6H_5$ and the mixture was stirred at 80° C. for 2 hours. There were added to the reaction mixture 150 g of a gluey calcium carbonate treated with a fatty acid commercially available under the trade name "CCR" made by Shiraishi Kogyo Kabushiki Kaisha, 65 g of dioctyl phthalate, 1 g of a hindered phenol antioxidant commercially available under the trade name "Nocrac NS-6" made by Ouchi Shinko Kagaku Kabushiki Kaisha, 3 g of tin octylate and 1 g of laurylamine, and the resultant was kneaded thoroughly by passing several times through a three roller paint mill to give a curable composition.

The composition was cured and property of resulting elastomer was measured as shown below. The results are shown in Table 1.

[Tensile Property]

According to Japanese Indurstrial Standard (JIS) A 5758, the type 2 H-shaped specimen was prepared from the obtained composition (adherend: anodic oxidized aluminum, primer: silicon compound commercially available under the trade name "APZ-730" made by Nippon Unica Kabushiki Kaisha). After aging the specimen under the predetermined test conditions, its tensile properties were measured.

In Table 1, $M_{150}$ is the modulus of elasticity at 150% elongation, $T_B$ is the modulus of elasticity at break and $E_B$ is the elongation at break.

[Tack]

The tack was estimated by touching the above specimen with the fingers.

[Storage stability]

The storage stability was estimated by a ratio of a viscosity of the composition stored at 50° C. for one week to a viscosity of the composition before storage. The viscosity was measured at 23° C. by using a Brookfield type viscometer.

The smaller the ratio, the more excellent the storage stability.

COMPARATIVE EXAMPLE 1

The produce of Example 1 was repeated except that the compound: $C_6H_5OSi(CH_3)_3$ was not added. The results are shown in Table 1.

COMPARATIVE EXAMPLES 2 AND 3

The procedure of Example 1 was repeated except that a compound: $(CH_3)_3SiOH$ (Comparative Example 2) or a compound: $(C_6H_5)_3SiOH$ (Comparative Example 3) was used instead of the compound: $C_6H_5OSi(CH_3)_3$. The results are shown in Table 1.

TABLE 1

| Ex. No. | Organic silicon compound (B) | H-type Tensile property | | | Tack (touch with fingers) | Storage stability |
| --- | --- | --- | --- | --- | --- | --- |
| | | $M_{150}$ (kg/cm$^2$) | $T_B$ (kg/cm$^2$) | $E_B$ (%) | | |
| Ex. 1 | $(CH_3)_3SiOC_6H_5$ | 2.5 | 5.8 | 710 | A*[1] | 0.92 |
| Com. Ex. 1 | — | 5.2 | 7.6 | 340 | A | 1.22 |
| Com. Ex. 2 | $(CH_3)_3SiOH$ | 3.5 | 6.3 | 490 | A | 0.92 |

TABLE 1-continued

| Ex. No. | Organic silicon compound (B) | H-type Tensile property | | | Tack (touch with fingers) | Storage stability |
|---|---|---|---|---|---|---|
| | | $M_{150}$ (kg/cm$^2$) | $T_B$ (kg/cm$^2$) | $E_B$ (%) | | |
| Com. Ex. 3 | (C$_6$H$_5$)$_3$SiOH | 2.5 | 5.9 | 680 | B*2 | 0.92 |

(Notes)
*1 The composition is as sticky as a composition having no organic silicon compound (B) (obtained in Comparative Example 2).
*2 The composition is stickier than a composition having no organic silicon compound (B) (obtained in Comparative Example 2).

From the results in Table 1, it is confirmed that when using the compound: (CH$_3$)$_3$SiOH, the tack is excellent but the modulus of elasticity and the elongation are unsatisfactory. Also, when using the compound: (C$_6$H$_5$)$_3$SiOH, the modulus of elasticity and the elongation are improved, but the tack is poor. On the other hand, when using the compound: (CH$_3$)$_3$SiOC$_6$H$_5$, the modulus of elasticity and the elongation are improved and the tack is excellent.

EXAMPLES 2 to 5 AND COMPARATIVE EXAMPLES 4 to 6

The procedure of Example 1 was repeated except that an organic silicon compound shown in Table 2 was used instead of the compound: C$_6$H$_5$OSi(CH$_3$)$_3$.
The results are shown in Table 2.

TABLE 2

| Ex. No. | Organic silicon compound (B) | $M_{150}$ (kg/cm$^2$) | Tack | Storage stability |
|---|---|---|---|---|
| Ex. 2 | (CH$_3$)$_3$SiOCH$_2$CH$_2$Cl | 3.3 | A | 1.02 |
| Ex. 3 | [(CH$_3$)$_3$SiOCH$_2$]$_2$ | 2.2 | A | 0.92 |
| Ex. 4 | [(CH$_3$)$_3$SiOCCH$_2$CH$_2$]$_2$ ‖ O | 3.3 | A | 1.18 |
| Ex. 5 | [(CH$_3$)$_3$SiO]$_3$B | 3.1 | A | 0.92 |
| Com. Ex. 4 | [(CH$_3$)$_3$Si]$_2$NH | 2.7 | A | 1.38 |
| Com. Ex. 5 | [(CH$_3$)$_3$Si]$_2$NCH$_3$ | 3.6 | A | 1.78 |
| Com. Ex. 6 | (CH$_3$SiNH)$_2$CO | 4.3 | A | 1.51 |

From the results in Table 2, it is confirmed that the curable composition of the presenet invention is excellent in the modulus of elasticity, the tack and the storage stability. On the other hand, when using the organic silicon compound generating a compound which is a silanol condensation catalyst, such as ammonium or amines, as the organic silicon compound component (B), the storage stability becomes poor.

EXAMPLES 6 AND COMPARATIVE EXAMPLE 7

To a 100 g of propylene oxide polymer having an average molecular weight of 10,000 and having on the average 2.7 methyl dimethoxysilyl groups per polymer molecule was added 3 g of a compound: C$_6$H$_5$OSi(CH$_3$)$_3$, and the mixture was stirred at 80° C. for 2 hours to give a curable composition (Example 6).

The tensile property of the obtained composition was measured in the similar manner as in Example 1.
The results are shown in Table 3.
The procedure of Example 6 was repeated except that the organic silicon compound is not added (Comparative Example 7).

TABLE 3

| Ex. No. | H-type tensile property | | |
|---|---|---|---|
| | $M_{50}$*1 (kg/cm$^2$) | $T_B$ (kg/cm$^2$) | $E_B$ (%) |
| Ex. 7 | 1.1 | 5.8 | 870 |
| Com. Ex. 7 | 2.8 | 6.7 | 420 |

(Note)
*1 $M_{50}$ is the modulus of elasticity at 50% elongation.

As apparent from above Examples, the composition of the present invention is excellent in the storage stability, and gives an elastomer having improved tensile strength and low residual tack.

In addition to the ingredients used in the Examples, other ingredients can be used in the Examples as set forth in the specification to obtain substantially the same results.

What we claim is:

1. A curable composition comprising (A) at least one organic polymer selected from the group consisting of a polyether, a polyester, an ether-ester block copolymer, a polybutadiene, a styrene-butadiene copolymer, an acrylonitrile-butadiene copolymer, an acrylic acid ester-butadiene copolymer, an ethylene-butadiene copolymer, a vinylpyridine-butadiene copolymer, an ethylene-propylene copolymer, an ethylene-vinylacetate copolymer, an ethylene-acrylic acid ester copolymer, a polyisoprene, a styrene-isobutylene copolymer, a styrene-isoprene copolymer, an isobutylene-isoprene copolymer, a polychloroprene, a styrene-chloroprene copolymer, an acrylonitrile-chloroprene copolymer, a polyisobutylene, a polyacrylic acid ester and polymethacrylic acid ester, said organic polymer containing at least one reactive silicon functional group crosslinkable to produce an elastomer by the formation of a siloxane bond in its molecule wherein said reactive silicon functional group is a group represented by the formula (2):

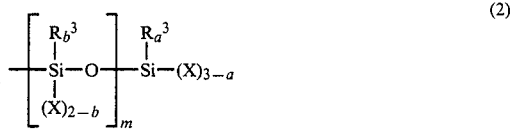

(2)

wherein R$^3$ is a monovalent hydrocarbon group having 1 to 20 carbon atoms selected from the group consisting of an alkyl group, as aryl group and an aralkyl group or a triorganosiloxy group represented by the formula (3):

(R$^4$)$_3$SiO—       (3)

in which each R$^4$ is a nonvalent hydrocarbon group having 1 to 20 carbon atoms, and when more than one R$^3$ are present, the groups R$^3$ are the same or different; X is a hydroxyl group or a hydrolyzable group, and when more than one X are present, the group X are the same or different; a is O or an integer of 1 to 3 and b is 0, 1 or 2, provided that at least one X is present in the silicon functional group; and; m is 0 or an integer of 1 to 18; and (B) an organic silicon compound having a molecular weight of not less than 140 and represented by the formula (1):

$$[(CH_3)_3SiO]_nR^1 \qquad (1)$$

wherein $R^1$ has a valence of n and is a residue of a substituted or unsubstituted aliphatic alcohol having 2 to 30 carbon atoms, a residue of a substituted or substituted or aromatic hydroxyl compound having 6 to 30 carbon atoms, a residue of a substituted or unsubstituted aliphatic or aromatic carboxylic acid having 2 to 30 carbon atoms, a residue of a polymeric compound having hydroxyl or carboxyl groups or a residue of an inorganic acid, and n is 1, 2 or 3.

2. The composition of claim 1, wherein the weight ratio of said organic polymer (A) to said organic silicon compoud (B) is from 100/0.1 to 100/10.

3. The compostion of claim 1, wherein said organic polymer (A) is an alkylene oxide polymer whose main chain consists essentially of recurring units represented by the formula:

$$-R^2-O$$

wherein $R^2$ is a bivalent hydrocarbon group having 1 to 8 carbon atoms.

4. The compostion of claim 1, wherein the number average molecular weight of said organic polymer (A) is from 300 to 30,000.

5. The compostion of claim 1, wherein said organic polymer (A) is a polymer whose main chain consists essentially of a propylene oxide and which has a molecular weight of 500 to 15,00.

6. The composition of claim 1, wherein said reactive silicon functional group is a group represented by the formula (4):

$$-\underset{\underset{|}{Si}}{\overset{R_a^3}{|}}-(X)_{3-a} \qquad (4)$$

wherein $R^3$ is a group having 1 to 20 carbon atoms selected from the group consisting of an alkyl group, an aryl group and an aralkyl group or a triorganosiloxy group represented by the formula (3):

$$(R^4)_3SiO- \qquad (3)$$

in which each $R^4$ is a monovalent hydrocarbon group having 1 to 20 carbon atoms, and when more than one $R^3$ are present, the groups $R^3$ are the same or different; X is a hydroxyl group or a hydrolyzable group, and when more than one X are present, the groups X are the same or different; and a is 0, 1 or 2.

7. The composition of claim 1, wherein the group X is a methoxy group.

8. The composition of claim 1, wherein the molecular weight of said organic silicon compound (B) is not less than 150.

9. The compostion of claim 1, wherein said organic silicon compound (B) is a compound represented by the formula;

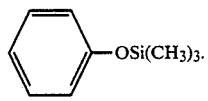

* * * * *